United States Patent [19]

Boros et al.

[11] 3,852,459

[45] Dec. 3, 1974

[54] METHOD OF PREPARATION AND PACKAGING OF INJECTABLE NITROFURANTOIN SODIUM

[75] Inventors: Leslie Boros, Plainview, N.Y.; Diana Loftin, Houston, Tex.

[73] Assignee: Savage Laboratories, Inc., Houston, Tex.

[22] Filed: June 20, 1972

[21] Appl. No.: 264,670

[52] U.S. Cl. ................................................ 424/273
[51] Int. Cl. ........................................... A61k 27/00
[58] Field of Search ................... 424/273; 260/240 A

[56] References Cited
UNITED STATES PATENTS

| | | | |
|---|---|---|---|
| 3,007,846 | 11/1961 | Gever et al. | 260/240 A |
| 3,066,671 | 12/1962 | Cohen | 128/272 |
| 3,163,163 | 12/1960 | Wilburn | 128/272 |

OTHER PUBLICATIONS

Husa's Pharmaceutical Dispensing, 6th Ed., 1966, pp. 398–404, 410 & 411.
Remington's Pharmaceutical Sciences, 1965, pp. 203 & 884.
Chemical Abstracts, 63:1670d, (1965).
Physicians Desk Reference, (P.D.R.), 1968, p. 662.

*Primary Examiner*—Stanley J. Friedman
*Assistant Examiner*—Leonard Schenkman
*Attorney, Agent, or Firm*—Blum, Moscovitz, Friedman & Kaplan

[57] ABSTRACT

Nitrofurantoin sodium parenteral solution is prepared without passing through a stage in which solid nitrofurantoin sodium is present. Solutions appropriate for either intravenous or intra-muscular injection can be prepared under the conditions presented.

8 Claims, No Drawings

METHOD OF PREPARATION AND PACKAGING OF INJECTABLE NITROFURANTOIN SODIUM

BACKGROUND OF THE INVENTION

Nitrofurantoin sodium has been employed in the pharmaceutical field as a urinary anti-bacterial agent in the form of a parenteral preparation for many years. In the conventional method of preparation, nitrofurantoin sodium is prepared as a sterile crystalline powder. The powder is then dissolved in sterile water or sterile dextrose solution for injection.

The objection to this procedure is that the sodium salt of nitrofurantoin is highly explosive so that in the drying and pulverization which is necessary so that the material will go into solution quickly, the material may explode. Two explosions actually occurred in 1969 and 1970 in the United States, resulting in serious personal injuries and requiring immediate stoppage of production.

It would seem that the difficulty could be avoided by preparing the nitrofurantoin sodium as a solution and avoiding the drying step. Unfortunately, the compound is quite unstable in solution, even at low temperature.

As another means of getting around the difficulty, nitrofurantoin sodium has been synthesized and freed of water by freeze-drying. The product suffers from the difficulty that it is relatively slow in dissolving in preparation for injection.

SUMMARY OF THE INVENTION

Nitrofurantoin as the acid is supplied in a sterile vial as a very fine suspension in an aqueous medium. An alkaline sodium compound is supplied as a solution in a second sterile vial. In preparation for an injection, the alkaline solution is removed from its vial and injected into the nitrofurantoin vial. Shaking the mixture for 10 to 30 seconds brings the nitrofurantoin completely into solution so that the resultant nitrofurantoin sodium solution is ready for injection.

Accordingly, an object of the present invention is to provide an improved process for preparing nitrofurantoin sodium in a form suitable for injection.

Another object of the present invention is to provide an improved process of preparing nitrofurantoin sodium without the risk of explosion.

A further object of the invention is to prepare nitrofurantoin sodium in solutions suitable for intravenous and for intra-muscular injection.

Still another object of the invention is to provide a dosage quantity of nitrofurantoin sodium in the form of a stable dispersion and a stable solution which can react to form nitrofurantoin sodium in an injectable solution.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

DESCRIPTION OF THE PREFERRED EMBODIMENTS

In preparing nitrofurantoin sodium solutions for injection, the solutions must be differentiated on the basis of whether they are to be used for intra-muscular or intravenous injection. Examples 1 through 3 illustrate suspensions of nitrofurantoin suspensions to be used in preparing solutions for intravenous injection.

EXAMPLE I

Each 5cc. contains:

| | |
|---|---|
| Nitrofurantoin U.S.P. | 164 mg. |
| Sodium Chloride U.S.P. | 0.9% |
| Benzyl Alcohol N.F. | 1.5% |
| Propylene Glycol U.S.P. | 50% |
| In Water for Injection | q.s. |

EXAMPLE II

Each 5cc. contains:

| | |
|---|---|
| Nitrofurantoin U.S.P. | 164 mg |
| Sodium Chloride U.S.P. | 0.9% |
| Benzyl Alcohol N.F. | 1.5% |
| Glycerine | 50% |
| In water for Injection | q.s. |

EXAMPLE III

Each 5cc. contains:

| | |
|---|---|
| Nitrofurantoin U.S.P. | 164 mg. |
| Sodium Chloride U.S.P. | 0.9% |
| Benzyl Alcohol N.F. | 1.5% |
| Propylene Glycol U.S.P. | 25% |
| Glycerine U.S.P. | 25% |
| In Water for Injection | q.s. |

It is to be understood that one of the above suspensions is supplied as a suspension in a first vial of a pair of vials. In the second vial is 5 cc. of an aqueous solution containing:

| | |
|---|---|
| Sodium Carbonate U.S.P. | 85mg to 100mg. |
| Benzyl Alcohol N.F. | 1.5% |
| In Water for injection | q.s. |

In preparation for injection into a patient, the diluent in the second vial containing the sodium carbonate is drawn up into a syringe and injected into the first vial containing the suspension of nitrofurantoin. Shaking for up to 30 seconds takes the nitrofurantoin completely into solution so that the solution is ready for intravenous injection.

If the amount of sodium carbonate dissolved in the diluent is closer to 85 mg than to 100 mg, then the time necessary for the suspended nitrofurantoin to go into solution will be slightly greater and the pH will be slightly lower. Also, it is desirable that the nitrofurantoin be micronized prior to preparation of the suspension to be placed in vial 1; the finer the particle size, the more quickly the nitrofurantoin will go into solution.

Following are compositions to be used for intramuscular injection:

EXAMPLE IV

Suspension - Each 2 cc. contains:

| | |
|---|---|
| Nitrofurantoin U.S.P. | 164 mg. |
| Sodium Chloride U.S.P. | 0.9% |
| Sodium Carboxymethylcellulose | 0.2% |
| Methyl Cellulose | 0.05% |
| Benzyl Alcohol N.F. | 1.5% |
| Water for Injection | q.s. |

Diluent - Each 1 cc. contains:

| | |
|---|---|
| Sodium Carbonate U.S.P. | 82.5 mg. |
| Benzyl Alcohol N.F. | 1.0% |
| Water for Injection | q.s. |

As is to be expected, the quantity of solution used for intra-muscular injection is smaller than that used for intravenous injection.

Sodium carbonate is not the only alkaline compound which can be used to take the nitrofurantoin into solution. The following diluent composition employs sodium hydroxide instead of sodium carbonate.

Diluent 1 cc contains:

| | |
|---|---|
| Sodium Hydroxide U.S.P. | 31.2 mg. |
| Benzyl Alcohol N.F. | 1.5% |
| Water for injection | q.s. |

In all cases, the quantity of alkali used is such as to bring the solution to be injected to a pH between 8.5 and 9.5.

As is conventional, all steps are to be carried out under sterile conditions. This applies also to the preparation of the nitrofurantoin suspension. This compound is sufficiently stable so that it can be autoclaved.

The quantities specified in the various Examples constitute doses suitable for an adult. The amount of solution withdrawn by the individual carrying out the operation can be adjusted to the age and weight of the patient into whom the solution is to be injected.

Dosage quantities of the nitrofurantoin suspension and the alkaline compound in solution can be made available together as a means of ensuring that relative quantities of reagents are appropriate. The quantities of solvent and diluent in each package of two vials are adjusted to be appropriate to the mode of injection, i.e., intra-muscular or intravenous.

It will thus be seen that the objects set forth above, among those made apparent from the preceding description, are efficiently attained, and since certain changes may be made in carrying out the above process, in the described product, and in the construction set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A process for the preparation of nitrofurantoin sodium dissolved in a solution suitable for intravenous injection, comprising the steps of forming a dispersion by suspending finely divided nitrofurantoin in an isotonic saline solution in the ratio of 164 mg of nitrofurantoin to 5 cc of said solution, said solution also containing 1.5 percent of benzyl alcohol and 50 percent of at least one alcohol selected from the group consisting of glycerine and propylene glycol, separately dissolving an alkaline sodium compound selected from the group consisting of sodium hydroxide and sodium carbonate in water for injection containing 1.0 to 1.5 percent of benzyl alcohol, the quantity of said alkaline sodium compound in said solution being such that on mixing said solution with an equal volume of nitrofurantoin suspension, the pH of the resultant solution lies between 8.5 and 9.5, mixing said solution and said dispersion containing suspended nitrofurantoin, and shaking the resultant mixture to bring said nitrofurantoin into solution as nitrofurantoin sodium, the quantities of nitrofurantoin and alkaline sodium compound being selected to form a dosage amount of nitrofurantoin sodium, and all steps in said process being carried out under sterile conditions.

2. The process as defined in claim 1, wherein said nitrofurantoin dispersion is stored in a first vial sealed with a stopper through which a hypodermic needle can be inserted and said alkaline sodium compound solution is stored in a second vial sealed with a stopper through which a hypodermic needle can be inserted.

3. The process as defined in claim 1, wherein each 5 cc of nitrofurantoin dispersion consists essentially of nitrofurantoin 164 mg., sodium chloride 0.9 percent, benzyl alcohol 1.5 percent, propylene glycol 50 percent and water for injection q.s. and each 5 cc of alkaline sodium compound solution consists essentially of sodium carbonate 85 mg. to 100 mg., benzyl alcohol 1.5 percent and water for injection q.s.

4. The process as defined in claim 1, wherein each 5 cc of nitrofurantoin dispersion consists essentially of nitrofurantoin 164 mg., sodium chloride 0.9 percent, benzyl alcohol 1.5 percent, glycerine 50 percent and water for injection q.s., and each 5 cc of alkaline sodium compound solution consists essentially of sodium carbonate 85 mg. to 100 mg., benzyl alcohol 1.5 percent, and water for injection q.s.

5. The process as defined in claim 1, wherein each 5 cc of nitrofurantoin dispersion consists essentially of nitrofurantoin 164 mg., sodium chloride 0.9 percent, benzyl alcohol 1.5 percent, propylene glycol 25 percent, glycerine 25 percent and water for injection q.s., and each 5 cc of alkaline sodium compound solution consists essentially of sodium carbonate 85 mg. to 100 mg., benzyl alcohol 1.5 percent, and water for injection q.s.

6. The product of the process as defined in claim 1.

7. A process for the preparation of nitrofurantoin sodium dissolved in a solution suitable for intra-muscular injection, comprising the steps of forming a dispersion by suspending 164 mg of finely divided nitrofurantoin in 2 cc of a first solution consisting essentially of 0.9 percent sodium carboxymethyl cellulose, 0.05 percent methyl cellulose, 1.5 percent benzyl alcohol and water q.s., forming a second solution by dissolving in water containing benzyl alcohol a member of the group consisting of sodium carbonate and sodium hydroxide, the quantities of sodium carbonate and benzyl alcohol when sodium carbonate is used being respectively 82.5 mg and 1 percent, and the quantities of sodium hydroxide and benzyl alcohol when sodium hydroxide is used being respectively 31.2 mg and 1.5 percent, mixing said dispersion and said second solution and shaking the resultant mixture to bring said nitrofurantoin into solution as nitrofurantoin sodium, all steps in said process being carried out under sterile conditions.

8. The product of the process as defined in claim 7.

* * * * *